(12) United States Patent
Lim et al.

(10) Patent No.: US 9,277,539 B2
(45) Date of Patent: Mar. 1, 2016

(54) METHOD FOR PERFORMING INTER-CELL DEVICE-TO-DEVICE (D2D) COMMUNICATION IN WIRELESS COMMUNICATION SYSTEM AND DEVICE THEREFOR

(71) Applicant: LG ELECTRONICS INC., Seoul (KR)

(72) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/354,879

(22) PCT Filed: Oct. 26, 2012

(86) PCT No.: PCT/KR2012/008853
§ 371 (c)(1),
(2) Date: Apr. 28, 2014

(87) PCT Pub. No.: WO2013/062351
PCT Pub. Date: May 2, 2013

(65) Prior Publication Data
US 2014/0315562 A1    Oct. 23, 2014

Related U.S. Application Data

(60) Provisional application No. 61/551,447, filed on Oct. 26, 2011.

(51) Int. Cl.
*H04W 72/00* (2009.01)
*H04W 72/04* (2009.01)
(Continued)

(52) U.S. Cl.
CPC .............. *H04W 72/04* (2013.01); *H04W 8/005* (2013.01); *H04W 76/023* (2013.01)

(58) Field of Classification Search
CPC .... H04W 76/023; H04W 72/04; H04W 8/005
USPC ............................... 455/450, 518, 435.1, 437
See application file for complete search history.

(56) References Cited

U.S. PATENT DOCUMENTS 8,279,851 B2 * 10/2012 Doppler et al. ................ 370/352
8,666,403 B2 *  3/2014 Yu et al. ...................... 455/435.1
(Continued)

FOREIGN PATENT DOCUMENTS

KR    10-2009-0062435       6/2009
KR    10-2011-0089311       8/2011
(Continued)

OTHER PUBLICATIONS

PCT International Application No. PCT/KR2012/008853, Written Opinion of the International Searching Authority dated Feb. 14, 2013, 19 pages.

*Primary Examiner* — Mong-Thuy Tran
(74) *Attorney, Agent, or Firm* — Lee, Hong, Degerman, Kang & Waimey (57) ABSTRACT

A method for performing inter-cell D2D communication includes: receiving a first signal which is a D2D communication request signal including information on a D2D terminal selected from D2D terminals within a cell to which a base station belongs; determining whether the selected D2D terminal is a D2D terminal within the cell using information on the selected D2D terminal; transmitting a second signal, for requesting inter-cell D2D communication to a base station belonging to a neighboring cell, if the selected D2D terminal is a D2D terminal belonging to the neighboring cell; receiving a third signal for approving the inter-cell D2D communication, from the base station cell as a response to the second signal; and transmitting, to the D2D terminal within the cell, information on a resource allocated for communication between the D2D terminal within the cell and the selected D2D terminal according to the third signal.

6 Claims, 5 Drawing Sheets

(51) Int. Cl.
*H04W 76/02* (2009.01)
*H04W 8/00* (2009.01)

(56) References Cited

U.S. PATENT DOCUMENTS

| | | | |
|---|---|---|---|
| 2010/0144357 A1* | 6/2010 | Chaudhri et al. | 455/450 |
| 2010/0240312 A1 | 9/2010 | Peng et al. | |
| 2011/0098043 A1* | 4/2011 | Yu et al. | 455/435.1 |
| 2012/0258706 A1* | 10/2012 | Yu | H04W 56/0045 455/426.1 |
| 2013/0059583 A1* | 3/2013 | Van Phan et al. | 455/435.1 |
| 2013/0150051 A1* | 6/2013 | Van Phan | H04W 12/04 455/437 |

FOREIGN PATENT DOCUMENTS

| | | |
|---|---|---|
| KR | 10-2011-0103852 | 9/2011 |
| WO | 2011/069295 | 6/2011 |

* cited by examiner

METHOD FOR PERFORMING INTER-CELL DEVICE-TO-DEVICE (D2D) COMMUNICATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2012/008853, filed on Oct. 26, 2012, which claims the benefit of U.S. Provisional Application Ser. No. 61/551,447, filed on Oct. 26, 2011, the contents of which are all hereby incorporated by reference herein in their entirety.

TECHNICAL FIELD

The present invention relates to a wireless communication, and more particularly, to a method of performing an inter-cell D2D communication in a wireless communication system and apparatus therefor.

BACKGROUND ART

Recently, as smartphones and tablet PCs are widely used and multimedia communications of high capacity are activated, mobile traffic increases rapidly. The increasing tendency of the mobile traffic in the future is expected to increase about twice each year. Since most of the mobile traffic is transmitted through a base station, communication service providers are currently confronted with serious network overloads. In order to handle the increasing traffic, the communication service providers increase network equipment investment and commercialize the next generation mobile communication standards (e.g., WiMAX, LTE (long term evolution), etc.) for efficiently handling lots of traffic in a hurry. Yet, in order to bear the amount of traffic expected to increase further rapidly, it is time to seek for other solutions.

D2D (device-to device) communication is a distributive communication technology for directly delivering traffic between adjacent nodes without using such an infrastructure as a base station. In D2D communication environment, each node such as a mobile terminal and the like searches for another user equipment physically adjacent to the corresponding node by itself, establishes a communication session, and then transmits traffic. Thus, since the D2D communication can solve the traffic overload problem in a manner of distributing the traffic focused on a base station, the D2D communication is spotlighted as an elementary technology of the post 4G next generation mobile communication. Such a standardization organization as 3GPP, IEEE and the like is promoting D2D communication standard enactment based on LTE-A or Wi-Fi. And, such a company as Qualcomm is developing an independent D2D communication technology.

D2D communication is expected to create new communication serves as well as to contribute to increase performance of a mobile communication system. And, the D2D communication can support adjacency based social network services or such a service as a network game and the like. If a D2D link is utilized as a relay, it is able to solve the problem of connectivity of a user equipment in a radio shadow area. Thus, the D2D technology is expected to provide new services in various fields.

Actually, D2D communication technologies including IR (infrared ray) communication, Zigbee, RFID (radio frequency identification), NFC (near field communications) based thereon are widely used nowadays. Yet, since these technologies can support communications for special purposes within a very limited distance only, it may be difficult to exactly categorize these technologies into the D2D communication technologies for distributing traffic of a base station.

So far, the D2D communication is described. However, no efforts has been made to research and develop a resource allocation process for performing inter-cell D2D communication, an inter-cell D2D communication performing process and the like until now.

DISCLOSURE OF THE INVENTION

Technical Tasks

One object of the present invention is to provide a wireless communication, and more particularly, to a method of performing inter-cell D2D communication in a wireless communication system.

Another object of the present invention is to provide an apparatus for performing inter-cell D2D communication in a wireless communication system.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing an inter-cell D2D (device-to-device) communication by a base station in a wireless communication system, according to one embodiment of the present invention may include the steps of receiving a first signal corresponding to a D2D communication request signal including information on a selected D2D user equipment from D2D user equipments within a cell having the base station belong thereto, determining whether the selected D2D user equipment is the D2D user equipment within the cell having the base station belong thereto using the information on the selected D2D user equipment, if the selected D2D user equipment is a D2D user equipment belonging to a neighboring cell, transmitting a second signal corresponding to a signal for requesting the inter-cell D2D communication to a base station belonging to the neighboring cell, receiving a third signal corresponding to a signal for approving the inter-cell D2D communication from the base station belonging to the neighboring cell in response to the second signal, and transmitting information on a resource allocated for a communication between the D2D user equipment within the cell and the selected D2D user equipment in accordance with the third signal to the D2D user equipment within the cell. The method may further include the step of transmitting information on a D2D zone allocated from the D2D communication to the D2D user equipment within the cell, and the selected D2D user equipment may include a user equipment selected by a D2D user equipment discovery through the D2D zone. The information on the selected D2D user equipment may include at least one of a cell identifier (ID) of a cell having the selected D2D user equipment belong thereto or a base station identifier and an identifier of the selected D2D user equipment. The second signal may include at least one of an identifier of the D2D user equipment within the cell, an identifier of the selected D2D user equipment, reference sequence information, a cyclic shift value, a hopping index, or a D2D request indicator indicating the D2D communication request. The D2D zone may correspond to an inter-cell common D2D zone.

To further achieve these and other advantages and in accordance with the purpose of the present invention, as embodied and broadly described, a method of performing an inter-cell D2D (device-to-device) communication by a base station in a wireless communication system, according to another embodiment of the present invention may include the steps of receiving a first signal corresponding to a D2D communication request signal including information on a D2D user equipment from D2D user equipments within a cell having the base station belong thereto, transmitting a second signal corresponding to a signal for requesting an inter-cell D2D communication to a base station of a neighboring cell having the D2D user equipment belong thereto in accordance with the first signal, receiving a third signal corresponding to a signal for approving the inter-cell D2D communication from the base station belonging to the neighboring cell in response to the second signal, and transmitting information on a resource allocated for a communication between the D2D user equipment within the cell and the selected D2D user equipment in accordance with the third signal to the D2D user equipment within the cell, wherein the first signal further includes information indicating that the selected D2D user equipment includes a D2D user equipment belonging to the neighboring cell.

To further achieve these and other advantages and in accordance with the purpose of the present invention, as embodied and broadly described, a method of performing an inter-cell D2D (device-to-device) communication by a base station in a wireless communication system, according to further embodiment of the present invention may include the steps of receiving a first signal corresponding to a signal for requesting a D2D communication from an intra-cell D2D user equipment, determining a D2D user equipment for performing the D2D communication with the intra-cell D2D user equipment based on the received first signal, determining whether the determined D2D user equipment is a D2D user equipment within a cell having the base station belong thereto or a D2D user equipment of a neighboring cell, if the determined D2D user equipment is the D2D user equipment of the neighboring cell, transmitting a second signal corresponding to a signal for requesting an inter-cell D2D communication to a base station belonging to the neighboring cell, receiving a third signal corresponding to a signal for approving the inter-cell D2D communication from the base station of the neighboring cell in response to the second signal, and transmitting allocation information on a resource for performing the D2D communication with the determined D2D user equipment of the neighboring cell to the intra-cell D2D user equipment, wherein the first signal includes information on at least one D2D user equipment having made a request for the D2D communication to the intra-cell D2D user equipment.

To further achieve these and other advantages and in accordance with the purpose of the present invention, as embodied and broadly described, a base station of performing an inter-cell D2D (device-to-device) communication in a wireless communication system, according to one embodiment of the present invention may include a receiver configured to receive a first signal corresponding to a D2D communication request signal including information on a selected D2D user equipment from D2D user equipments within a cell having the base station belong thereto, a processor configured to determine whether the selected D2D user equipment is the D2D user equipment within the cell having the base station belong thereto using the information on the selected D2D user equipment, and a transmitter, if the selected D2D user equipment is a D2D user equipment belonging to a neighboring cell, transmitting a second signal corresponding to a signal for requesting the inter-cell D2D communication to a base station belonging to the neighboring cell, wherein the receiver is configured to further receive a third signal corresponding to a signal for approving the inter-cell D2D communication from the base station belonging to the neighboring cell in response to the second signal and wherein the transmitter is configured to further transmit information on a resource allocated for a communication between the D2D user equipment within the cell and the selected D2D user equipment in accordance with the third signal to the D2D user equipment within the cell.

To further achieve these and other advantages and in accordance with the purpose of the present invention, as embodied and broadly described, a base station of performing an inter-cell D2D (device-to-device) communication in a wireless communication system, according to another embodiment of the present invention may include a receiver configured to receive a first signal corresponding to a signal for requesting a D2D communication from an intra-cell D2D user equipment, a processor configured to determine a D2D user equipment for performing the D2D communication with the intra-cell D2D user equipment based on the received first signal, the processor configured to determine whether the determined D2D user equipment is a D2D user equipment within a cell having the base station belong thereto or a D2D user equipment of a neighboring cell, and a transmitter, if the determined D2D user equipment is the D2D user equipment of the neighboring cell, transmitting a second signal corresponding to a signal for requesting an inter-cell D2D communication to a base station belonging to the neighboring cell, wherein the receiver is configured to further receive a third signal corresponding to a signal for approving the inter-cell D2D communication from the base station of the adjacent cell in response to the second signal, wherein the transmitter is configured to further transmit allocation information on a resource for performing the D2D communication with the determined D2D user equipment of the neighboring cell to the intra-cell D2D user equipment, and wherein the first signal includes an information on at least one D2D user equipment having made a request for the D2D communication to the intra-cell D2D user equipment.

To further achieve these and other advantages and in accordance with the purpose of the present invention, as embodied and broadly described, a base station of performing an inter-cell D2D (device-to-device) communication in a wireless communication system, according to further embodiment of the present invention may include a processor configured to receive a first signal corresponding to a D2D communication request signal including information on a selected D2D user equipment from D2D user equipments within a cell having the base station belong thereto, the processor configured to transmit a second signal corresponding to a signal for requesting an inter-cell D2D communication to a base station of a neighboring cell having the D2D user equipment belong thereto in accordance with the first signal, the processor configured to receive a third signal corresponding to a signal for approving the inter-cell D2D communication from the base station belonging to the neighboring cell in response to the second signal, the processor configured to transmit information on a resource allocated for a communication between the D2D user equipment within the cell and the selected D2D user equipment in accordance with the third signal to the D2D user equipment within the cell.

Advantageous Effects

According to various embodiments of the present invention, the inter-cell D2D communication can be efficiently performed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 1:
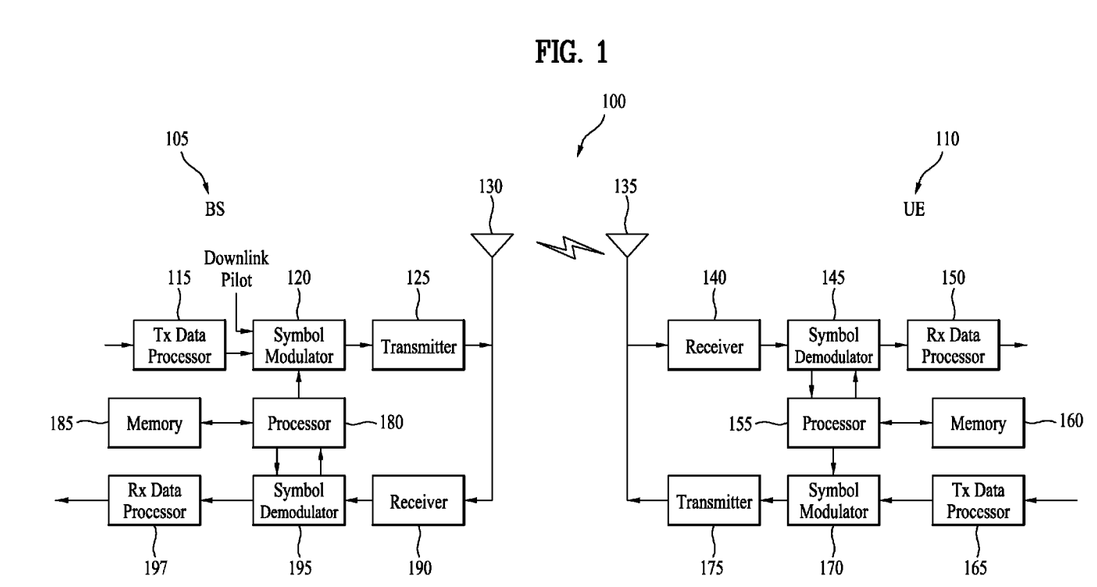
FIG. 1 is a block diagram for configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. A user equipment 110 may include a transmitted (Tx) data processor 165, a symbol modulator 170, a transmitter 175, a transceiving antenna 135, a processor 155, a memory 160, a receiver 140, a symbol demodulator 145 and a received data processor 150. Although the base station and user equipment in the drawing includes only one antenna, each of the base station and the user equipment includes a plurality of antennas. Therefore, each of the base station and the user equipment of the present invention supports an MIMO (multiple input multiple output) system. The base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment and an base station may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides information transfer service via a physical channel. RRC (radio resource control) layer belongs to the $3^{rd}$ layer and provides control radio resourced between UE and network. A user equipment and a base station may be able to exchange RRC messages with each other via radio communication layer and RRC layers.

'D2D user equipment' mentioned in the following description means a user equipment capable of D2D communication in a manner that such a wireless communication system (or a cellular network) as 3GPP LTE system, LTE-A system, IEEE 802 system and the like supports a direct communication between user equipments. Generally, in order to perform a communication, a user equipment located in a cell of a cellular network accesses a base station, receives control information for exchanging data with the base station, and is then able to exchange the data with the base station. In particular, since a user equipment transceives data through a base station, in order for one user equipment to transmit data to another user equipment, the former user equipment transmits its data to the base station and the base station having received the data then transmits the received data to the latter user equipment. Thus, in order for one user equipment to transmit data to another user equipment, since the former user equipment can transmit the data through the base station only, the base station performs scheduling on a channel and resource for the data transceiving and should transmit the scheduling information to each of the user equipments. Yet, since D2D user equipments can transceive data with each other in direct without a base station, it is able to reduce the burden of the base station scheduling.

D2D user equipment is able to recognize other D2D user equipments existing nearby through discovery. If the D2D user equipment performing the D2D discovery is located on a cell edge of a cellular network, it is able to recognize a D2D user equipment located in an adjacent cell. Since a D2D user equipment performs a D2D communication by receiving control signaling for the D2D communication, a coordinated operation with a nearby base station is necessary in order to transceive data by the D2D communication with another D2D user equipment located in another cell. According to the present invention, a collaborative D2D operation for the efficient data transceiving between inter-cell D2D user equipments is defined and described.

Figure 2:
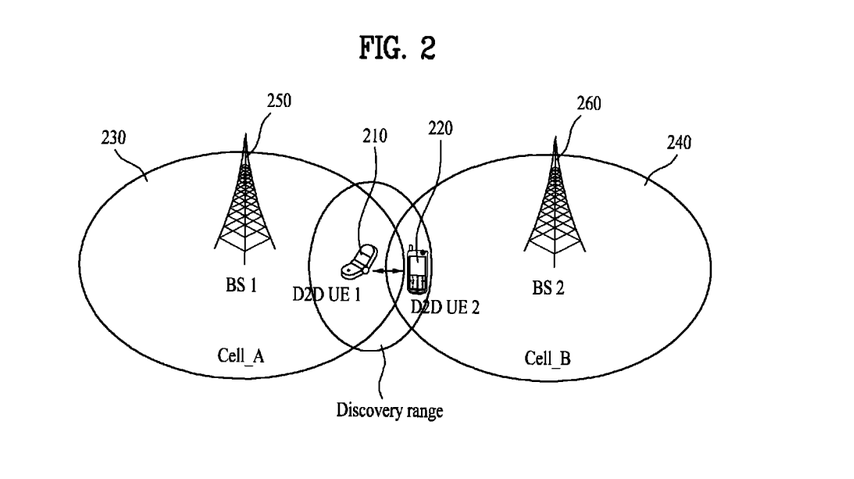
FIG. 2 is a diagram for one example to describe a method for inter-cell D2D user equipments to perform communication in a cellular network.

FIG. 2 is a diagram for one example to describe a method for inter-cell D2D user equipments to perform communication in a cellular network.

First Embodiment

Collaborative D2D Operation in Scenario for Allowing Discovery Between D2D User Equipments (or Peers) of Different Cells and D2D Communication D2D user equipment 1 210 performs a D2D discovery to discover a D2D user equipment 2 220 located nearby. In doing so, in order for the D2D user equipment 1 210 existing on an edge of a cell 230 to discover D2D user equipments (e.g., the D2D user equipment 2 220 is exemplarily shown in FIG. 2 and a plurality of D2D user equipments can exist) existing in an adjacent (neighboring) cell 240, a discovery signal should be transceived between the two D2D user equipments 210 and 220 respectively located in different cells. Hence, in order for the D2D user equipment 1 210 to discover and recognize the D2D user equipment 2 220 existing nearby irrespective of the cell 230 in which the D2D user equipment 1 210 is located, it is able to use a cell common D2D zone (or, named an inter-cell common D2D zone). And, a base station is able to assign the cell common D2D zone to the D2D user equipments. This cell common D2D zone is a dedicate zone. In the D2D dedicated zone interval, all D2D user equipments can perform the discovery irrespective of cells.

In order to perform D2D communication between D2D user equipments existing in different cells, each of a base station 1 250 of the cell 230 and a base station 2 260 of the cell 240 configures a D2D zone in cell common, whereby a D2D user equipment of another cell located within a discovery range can be discovered. And, the D2D user equipment of each of the cells can receive information on the cell common D2D zone through a broadcast signal from a serving base station, a broadcast channel and the like.

Figure 3:
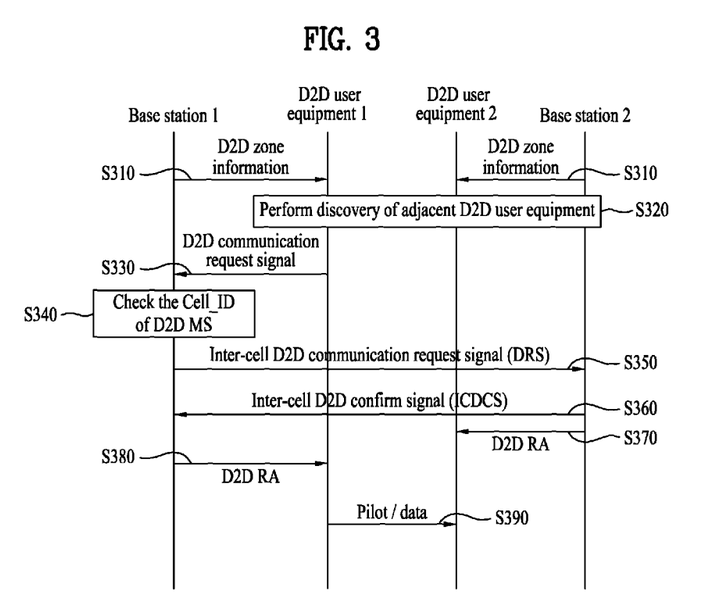
FIG. 3 is a diagram for one example of a process for performing an inter-cell collaborative D2D operation according to a $1^{st}$ embodiment of the present invention.

FIG. 3 is a diagram for one example of a process for performing an inter-cell collaborative D2D operation according to a 1$^{st}$ embodiment of the present invention.

Referring to FIG. 3, a D2D user equipment 1 can receive information on a cell common D2D zone (or D2D zone) from a base station 1 corresponding to a serving base station and a D2D user equipment 2 can receive the information on the cell common D2D zone (or D2D zone) from a base station 2 corresponding to a serving base station [S310]. Thereafter, each of the D2D user equipment 1 and the D2D user equipment 2 can recognize D2D user equipments located nearby by transceiving a discovery signal through the cell common D2D zone assigned by the corresponding base station [S320]. In doing so, in order for each of the D2D user equipments to determine whether the D2D user equipments located nearby are D2D user equipments existing in a serving cell or D2D user equipments existing in an adjacent cell, a D2D identity signal (or D2D discovery signal) transmitted by the corresponding D2D user equipment can be transmitted in a manner of including a cell ID of the cell 230 to which the D2D user equipment currently belongs, a current status of the D2D user equipment and the like as well as an identifier (ID) of the corresponding D2D user equipment. Thus, since the discovery signal transmitted by the D2D user equipment includes the cell ID, the D2D user equipment having received the discovery signal can recognize the identifier of the D2D user equipment located nearby and the cell or serving base station to which the corresponding D2D user equipment belongs.

Thus, having selected the D2D user equipment which will perform a D2D communication from the adjacent D2D user equipments recognized through the D2D discovery process, the transmitting D2D user equipment can transmit information (e.g., STID (station ID) of the receiving D2D user equipment, C-RNTI (cell-radio network temporary identifier) of the receiving D2D user equipment, a cell ID to which the receiving D2D user equipment belongs, a status of the receiving D2D user equipment, etc.) of the receiving D2D user equipment to the serving base station through a D2D communication request signal [S330]. In FIG. 3, the D2D user equipment 1 selects the receiving D2D user equipment and then transmits the D2D communication request signal to the base station 1 corresponding to the serving base station.

Meanwhile, having received the information on the receiving D2D user equipment which will perform the D2D communication through the D2D communication request signal for requesting the D2D communication from the D2D user equipment within the cell, the base station (e.g., the base station 1 in FIG. 3) can check the cell ID of the selected receiving D2D user equipment (e.g., the D2D user equipment 2) [S340]. The base station determines whether the selected receiving D2D user equipment belongs to its cell or another cell. If the receiving D2D user equipment belongs to another cell (or the adjacent cell), the base station can transmit an inter-cell D2D communication request signal (IDRS) for performing D2D operation to the serving base station (in FIG. 3, the serving base station of the D2D user equipment 2 is the base station 2) of the corresponding receiving D2D user equipment [S350].

In doing so, the inter-cell D2D communication request signal (IDRS) transmitted by the base station 1 can be transmitted in a manner of including at least one information of D2D user equipment identifiers (e.g., an identifier of the transmitting D2D user equipment (D2D user equipment 1) and an identifier of the receiving D2D user equipment (D2D user equipment 2), a proposed allocated resource information, a reference sequence, a cyclic shift value, a hopping index, a D2D request indicator indicating a D2D communication request and the like.

Having received such information from the base station (i.e., the base station 1) of the adjacent cell, the base station (i.e., the base station 2) obtains a current transmission status of the requested D2D performing D2D user equipment and then determines whether allocate the resource or band proposed for the D2D communication transmitted by the base station (base station 1) of the adjacent cell.

If the D2D user equipment can perform the D2D communication and the base station 2 is able to allocate the resource or band proposed for the D2D communication by the base station (base station 1) of the adjacent cell, the base station 2 can transmit a confirmation of the determination to the adjacent base station (base station 1) using an inter-cell D2D confirm signal (ICDCS) [S360]. In doing so, the inter-cell D2D confirm signal (ICDCS) is transmitted in a manner of being represented as Acknowledgement/Negative acknowledgement (ACK/NACK) or can be transmitted in a manner of including a D2D confirm indicator, a resource information (e.g., channel or band index), a start timing information and the like.

Having transmitted the inter-cell D2D confirm signal (ICDCS) to the adjacent base station (base station 1), the base station 2 can perform the following operation in order to perform the D2D communication. First of all, in case that the D2D performing user equipment is in an idle status, the base station 2 enables a mode of the D2D user equipment 2 to be changed by transmitting a D2D paging signal to the D2D user equipment 2 in order to perform the D2D communication with the D2D user equipment 1 of the adjacent cell and also transmits information (D2D RA (resource allocation)) on the resource/band allocated for the D2D communication execution to the D2D user equipment 2 [S370].

Having received the inter-cell D2D confirm signal (ICDCS) from the base station 2, the base station 1 can transmit the D2D resource information, the transmission timing information, the reference signal information and the like, which are obtained through the inter-cell D2D confirm signal (ICDCS) reception, to the D2D user equipment 1 attempting to perform the D2D communication [S380]. The D2D user equipment can set a transmission power for a D2D transmission, MIMO (multiple input multiple output), MCS (modulation and coding scheme), PMI (precoding matrix index) and the like by measuring a channel through this reference signal transmission.

Thereafter, the D2D user equipment 1 can perform the D2D communication of transmitting a reference signal (pilot signal) and data to the D2D user equipment 2.

Meanwhile, according to the description within reference to FIG. 3, in the step S340, the base station (e.g., the base station 1) compares the cell ID of the selected receiving D2D user equipment to the cell ID of the cell to which the base station 1 belongs, which can be performed by the D2D user equipment as well. In particular, each of the D2D user equipment 1 and the D2D user equipment 2 can select the receiving D2D user equipment in the course of discovering the adjacent D2D user equipment in the step S320 and is then able to compare whether the cell ID of the selected receiving D2D user equipment is identical to that of the cell to which the D2D user equipment 1 or the D2D user equipment 2 belongs. Thereafter, in case that the D2D user equipment 1 transmits the D2D communication request signal to the base station 1 in the step S330, a result of the comparison can be transmitted by being included in the D2D communication request signal.

Figure 4:
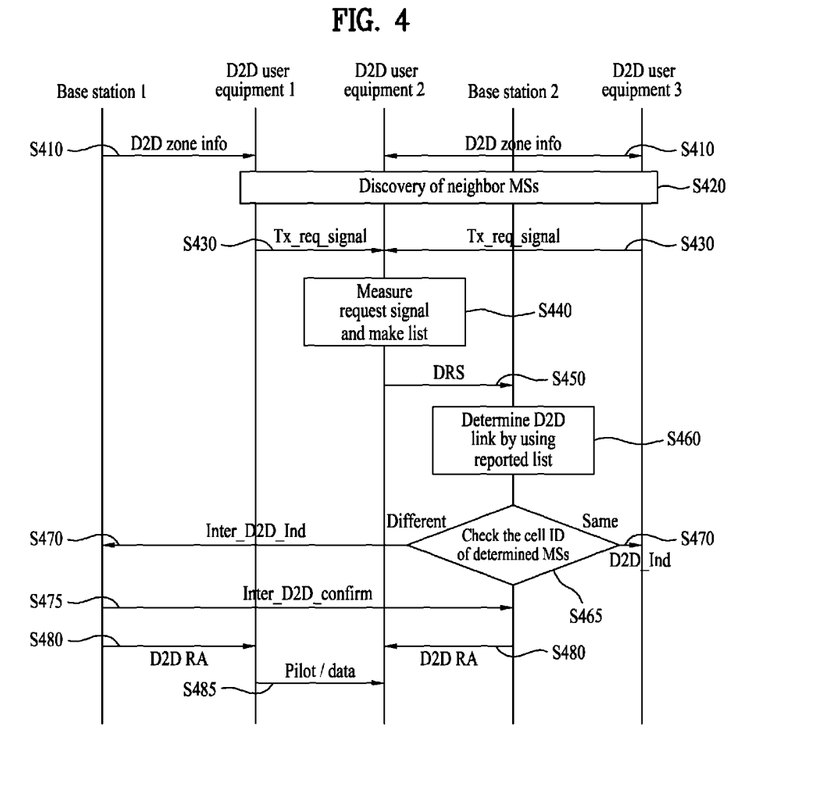
FIG. 4 is a diagram for one example of a process for performing an inter-cell collaborative D2D operation according to a $1^{st}$ embodiment of the present invention.

FIG. 4 is a diagram for one example of a process for performing an inter-cell collaborative D2D operation according to a 1$^{st}$ embodiment of the present invention.

Referring to FIG. 4, D2D user equipment 1 is able to receive information on a cell common D2D zone (or a D2D zone) from a base station 1 as a serving base station and D2D user equipment 2 and D2D user equipment 3 can receive the information on the cell common D2D zone (or the D2D zone) from a base station 2 as a serving base station [S410]. Subsequently, each of the D2D user equipment 1, the D2D user equipment 2 and the D2D user equipment 3 performs a process for discovering D2D user equipments located nearby [S420]. Having recognized the nearby located D2D user equipments through the discovery, the D2D user equipment 2 can receive a D2D communication request signal transmitted by each of the nearby located D2D user equipment 1 and the nearby located D2D user equipment 2 [S430].

In doing so, for the decoding feasibility of the D2D communication request signals transmitted by the D2D user equipments of different cells (e.g., the D2D user equipment 1 exists in the cell having the base station 1 belong thereto and the D2D user equipment 3 exists in the cell having the base station 2 belong thereto), a zone for transmitting a cell-common D2D communication request signal may be necessary. And, the D2D communication request signals can be transmitted through the cell-common D2D communication request signal transmitting zone.

The D2D user equipment 2 measures the D2D communication request signal and is able to compose a list of information on the user equipments (e.g., D2D user equipment 1 and D2D user equipment 2) having requested the D2D communications [S440]. And, the D2D user equipment 2 can transmit a D2D communication request signal (CRS) to the base station 2 that is the serving base station [S450]. In this case, the list composed by the D2D user equipment 2 can be contained in the D2D communication request signal (DRS).

Having received the D2D list from the D2D user equipment 2, the base station 2 can determine a D2D user equipment suitable for a D2D user equipment from the list [S460]. In particular, the base station 2 can determine the D2D user equipment in consideration of QoS, a received signal strength indicator (RSSI), a signal to noise ratio (SNR), an interference level and the like, which are included in the list transmitted by the corresponding D2D user equipment. Subsequently, the base station 2 can recognize the base station to which the determined D2D user equipment belongs by checking a cell ID of the cell to which the determined D2D user equipment belongs [S465].

As a result of the cell ID check, if the determined D2D user equipment is a D2D user equipment (e.g., D2D user equipment 1) of the adjacent cell, the base station 2 transmits an inter-cell D2D communication request signal (IDRS) for requesting an inter-cell D2D communication to the base station 1 that is a base station of the adjacent cell [S470]. On the contrary, if the determined D2D user equipment is a D2D user equipment (e.g., D2D user equipment 3) belonging to its cell, the base station 1 transmits a D2D communication request signal D2D_Ind to the D2D user equipment 3 [S470].

Subsequently, the base station 1 transmits an inter-cell D2D confirm signal inter_D2D_confirm for granting the inter-cell D2D communication to the base station 2 in response to the inter-cell D2D communication request signal [S475] and is also able to transmit a D2D resource allocation information D2D RA for the D2D communication to the D2D user equipment 1 [S480]. Having received the inter-cell D2D confirm signal, the base station 2 can transmit a D2D resource allocation information to the D2D user equipment 2 as well [S480].

Thereafter, the D2D user equipment is able to perform the D2D communication for transmitting a reference signal (pilot), data and the like to the D2D user equipment 2 through the assigned D2D zone [S485].

Figure 5:
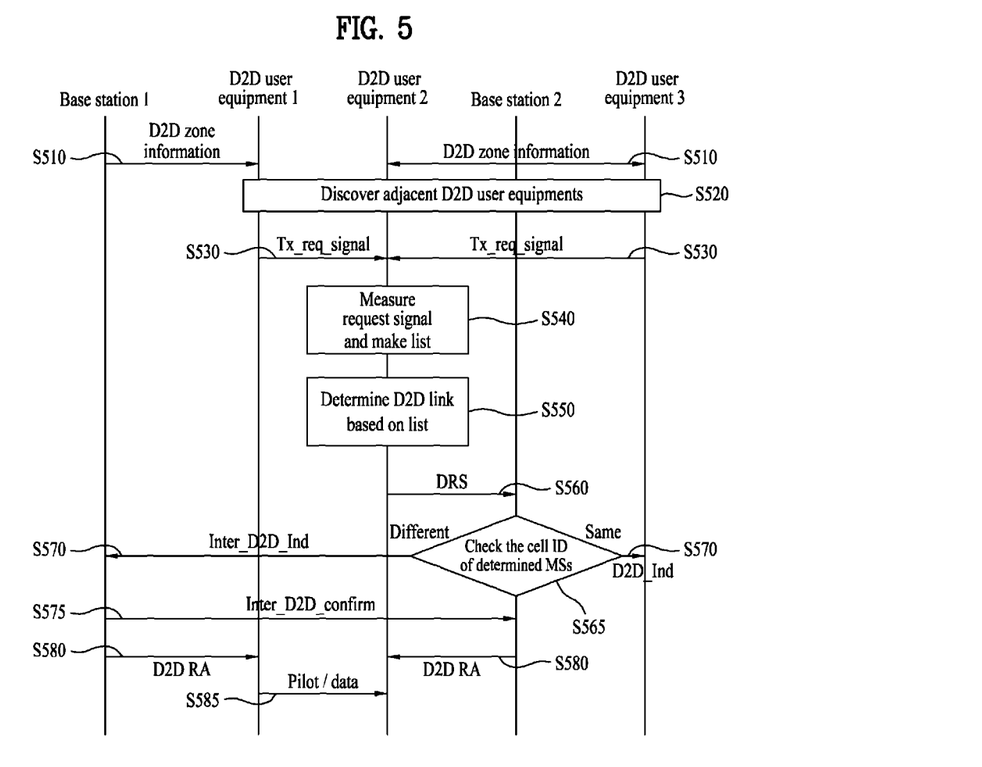
FIG. 5 is a diagram for another example of a process for performing an inter-cell collaborative D2D operation according to a $1^{st}$ embodiment of the present invention.

FIG. 5 is a diagram for another example of a process for performing an inter-cell collaborative D2D operation according to a 1$^{st}$ embodiment of the present invention.

Referring to FIG. 5, like the case shown in FIG. 4, D2D user equipment 1 is able to receive information on a cell common D2D zone (or a D2D zone) from a base station 1 as a serving base station and D2D user equipment 2 and D2D user equipment 3 can receive the information on the cell common D2D zone (or the D2D zone) from a base station 2 as a serving base station [S510]. Subsequently, each of the D2D user equipment 1, the D2D user equipment 2 and the D2D user equipment 3 performs a process for discovering D2D user equipments located nearby [S520]. Having recognized the nearby located D2D user equipments through the discovery, the D2D user equipment 2 can receive a D2D communication request signal transmitted by each of the nearby located D2D user equipment 1 and the nearby located D2D user equipment 2 [S530].

In doing so, for the decoding feasibility of the D2D communication request signals transmitted by the D2D user equipments of different cells (e.g., the D2D user equipment 1 exists in the cell having the base station 1 belong thereto and the D2D user equipment 3 exists in the cell having the base station 2 belong thereto), a zone for transmitting a cell-common D2D communication request signal may be necessary. And, the D2D communication request signals can be transmitted through the cell-common D2D communication request signal transmitting zone.

The D2D user equipment 2 measures the D2D communication request signal and is able to compose a list of information on the user equipments (e.g., D2D user equipment 1 and D2D user equipment 2) having requested the D2D communications [S540].

Unlike the case shown in FIG. 4, the D2D user equipment 2 can determine a D2D user equipment (D2D link) suitable for a D2D user equipment based on information on a D2D list directly composed by the D2D user equipment 2 [S550]. In doing so, the D2D user equipment 2 can determine the D2D user equipment in consideration of QoS, a received signal strength indicator (RSSI), a signal to noise ratio (SNR), an interference level and the like, which are included in the list transmitted by the corresponding D2D user equipment. Subsequently, the D2D user equipment 2 can transmit a D2D communication request signal (DRS) to the base station 2 that is the serving base station [S560]. In this case, the information on the D2D user equipment (i.e., the D2D linked user equipment) determined by the D2D user equipment 2 can be contained in the D2D communication request signal.

Thereafter, the base station 2 can recognize the base station to which the determined D2D user equipment belongs by checking a cell ID of the cell to which the determined D2D user equipment belongs [S565]. And, the following steps S570 to S585 are identical to the former steps S470 to S485 described with reference to FIG. 4.

Second Embodiment

D2D Operating Method for Limiting Peer Discovery (D2D User Equipment Discovery) within Cell If different cell peer discoveries are enabled and communications are actually allowed, operations can be complicated due to such a problem as an inter-cell scheduling and the like and resources can be wasted. Therefore, according to a $2^{nd}$ embodiment of the present invention, a peer discovery may be allowed between user equipments in cells. In particular, a peer discovery zone for inter-cell collaboration can be orthogonally assigned between cells. In doing so, as a method of orthogonal assignment, it is able to consider a method of implicit assignment by (1) collaboration based on signaling between base stations or (2) a function of cell ID and the like.

Third Embodiment

Method of Using Inter-Cell D2D User Equipment Discovery of $1^{st}$ Embodiment and Intra-Cell D2D User Equipment Discovery of $2^{nd}$ Embodiment Together A zone possible for a peer discovery of a device (D2D user equipment) of a different cell and a zone for a peer discovery of a D2D user equipment within a cell are provided, each D2D user equipment performs a peer discovery through the corresponding zone by a configuration between a base station and a D2D user equipment, a procedure determined for each zone can be then performed.

For instance, regarding an inter-cell peer discovery zone and an intra-cell peer discovery zone, a base station determines a configuration for each D2D user equipment or the D2D user equipment is allowed to make a request to the base station. Alternatively, each zone can be mapped in accordance with property of a D2D communication service.

Thus, since a D2D user equipment performs an inter-cell peer discovery process according to the $1^{st}$ embodiment through an inter-cell peer discovery zone and also performs an intra-cell peer discovery process according to the $2^{nd}$ embodiment through an intra-cell peer discovery zone, the D2D communication corresponding to the two embodiments can be performed.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of performing an inter-cell D2D communication in a wireless communication system and apparatus therefor are industrially applicable to various kinds of communication systems including 3GPP LTE, 3GPP LTE-A, IEEE 802 and the like.

What is claimed is:

1. A method of a serving base station (BS) performing inter-cell D2D (device-to-device) communication in a wireless communication system, the method comprising:
   receiving a first signal from a D2D user equipment (UE) within a serving cell that includes the serving BS, the first signal including an inter-cell D2D communication request signal that includes information related to a D2D UE selected by D2D discovery;
   transmitting a second signal including the inter-cell D2D communication request signal to a neighbor BS belonging to a neighboring cell if the selected D2D UE belongs to the neighboring cell, wherein the second signal further includes reference signal sequence information for the inter-cell D2D communication, a cyclic shift value for the inter-cell D2D communication, or a hopping index for the inter-cell D2D communication;
   receiving a third signal from the neighbor BS in response to the second signal, the third signal including a signal for approving the inter-cell D2D communication between the D2D UE and the selected D2D UE and a start time of the inter-cell D2D communication; and
   transmitting a fourth signal to the D2D UE, the fourth signal including information related to a resource allocated for the inter-cell D2D communication and the start time of the inter-cell D2D communication.

2. The method of claim 1, further comprising:
   transmitting information to the D2D UE, the information related to a D2D zone allocated for D2D discovery; and selecting the D2D UE by discovery via the allocated D2D zone.

3. The method of claim 2, wherein the D2D zone corresponds to an inter-cell common D2D zone.

4. A base station (BS) performing an inter-cell D2D (device-to-device) communication in a wireless communication system, the BS comprising:
 a receiver configured to receive a first signal from a D2D user equipment (UE) within a serving cell that includes the BS, the first signal including an inter-cell D2D communication request signal that includes information related to a D2D UE selected by D2D discovery; and
 a transmitter configured to transmit a second signal including the inter-cell D2D communication request signal to a neighbor BS if the selected D2D UE belongs to a neighboring cell,
 wherein the second signal further includes reference signal sequence information for the inter-cell D2D communication, a cyclic shift value for the inter-cell D2D communication, or a hopping index for the inter-cell D2D communication,
 wherein the receiver is further configured to receive a third signal from the neighbor BS in response to the second signal, the third signal including a signal for approving the inter-cell D2D communication between the D2D UE and the selected D2D UE and a start time of the inter-cell D2D communication, and
 wherein the transmitter is further configured to transmit a fourth signal to the D2D UE, the fourth signal including information related to a resource allocated for the inter-cell D2D communication and the start time of the inter-cell D2D communication.

5. The BS of claim 4, wherein:
 the transmitter is further configured to transmit information to the D2D UE, the information related to a D2D zone allocated for D2D discovery; and
 the D2D UE is selected by discovery via the allocated D2D zone.

6. The BS of claim 5, wherein the D2D zone corresponds to an inter-cell common D2D zone.

* * * * *